Aug. 4, 1925.
C. H. DESAUTELS
1,548,356
TREAD APPLYING MEANS
Filed Oct. 2, 1922
2 Sheets-Sheet 1
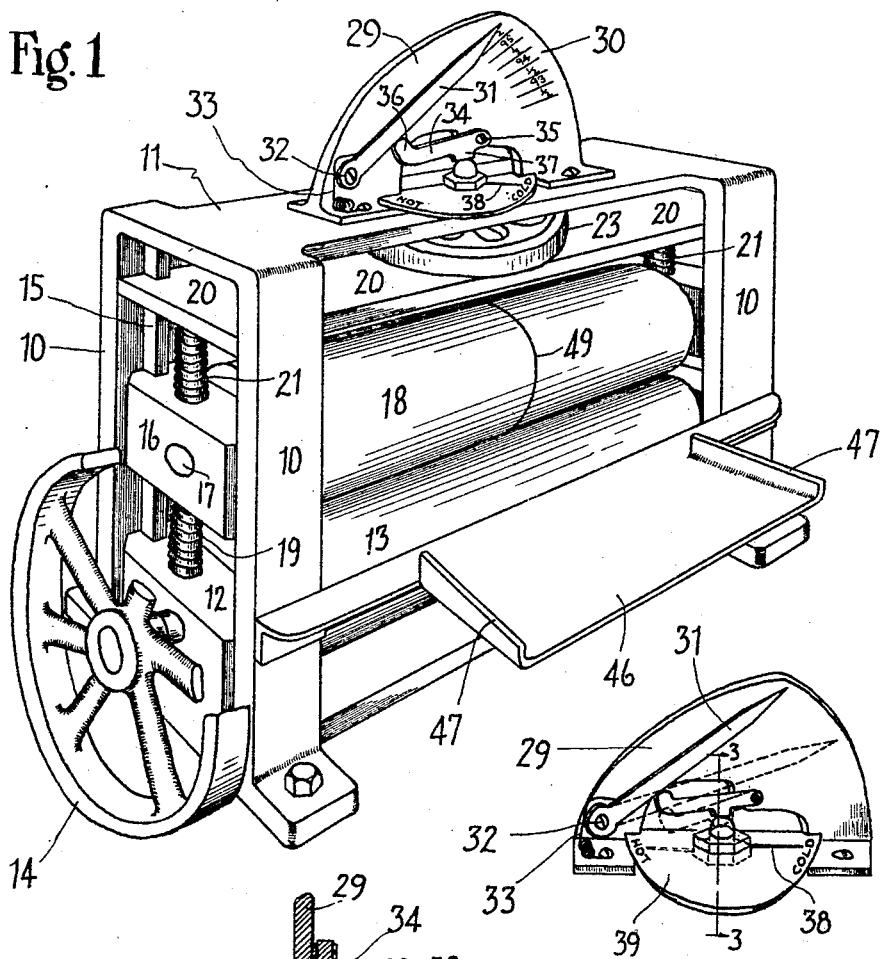
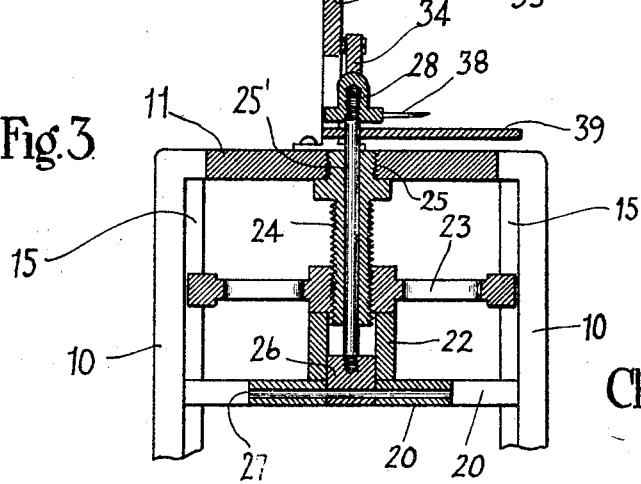
INVENTOR
Charles H. Desautels
BY
ATTORNEY

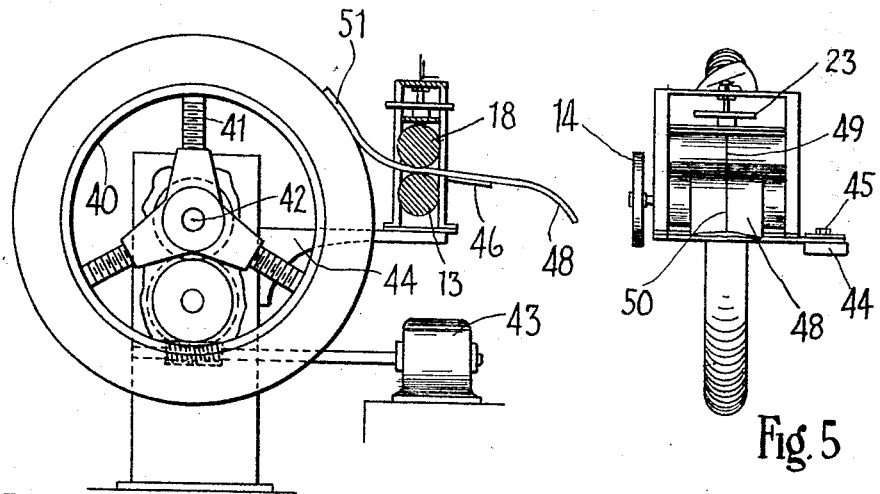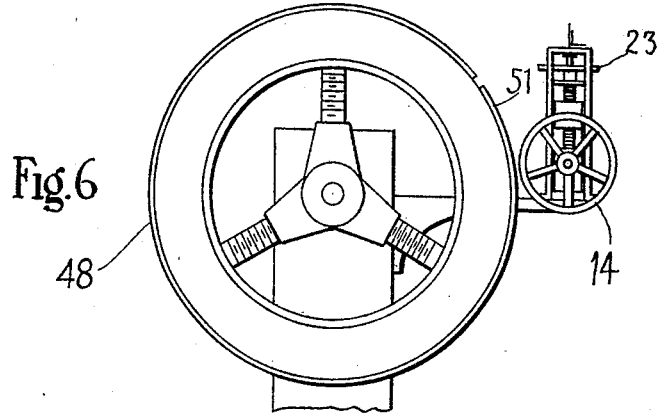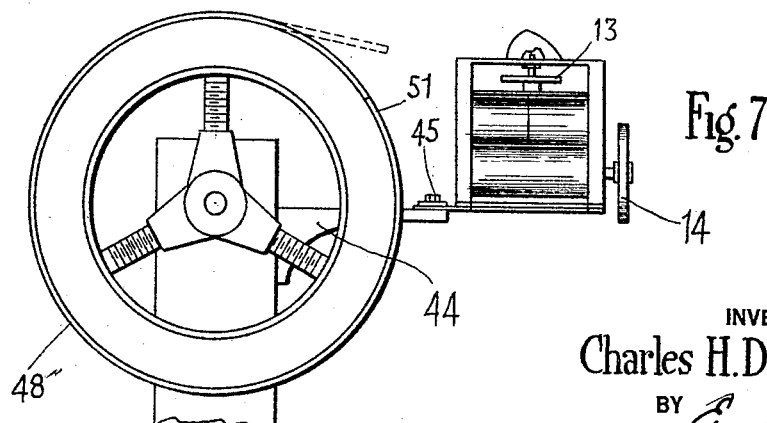

Patented Aug. 4, 1925.

1,548,356

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TREAD-APPLYING MEANS.

Application filed October 2, 1922. Serial No. 591,864.

*To all whom it may concern:*

Be it known that I, CHARLES H. DE-SAUTELS, a citizen of the United States of America, residing at Springfield, in the county of Hampden and State of Massachusetts, have invented certain new and useful Improvements in Tread-Applying Means, of which the following is a specification.

My invention relates to the stretching and applying of elastic material to circular forms and will be described in connection with the application of the usual rubber tread to automobile tires. It has for its object the application of such material to the form under more accurate conditions of stretch and position than was formerly possible, with greater speed, and with ready adaptability to strips of varying length. It has for a further object the provision of improved mechanism and indicators for properly applying the material. It has other and further objects which will appear from the following description and claims.

The invention will now be described with particular reference to the accompanying drawings, in which Fig. 1 is a perspective view of a stretching and guiding apparatus constructed according to my invention;

Fig. 2 is a perspective detail of certain parts shown in Fig. 1;

Fig. 3 is a section substantially on line 3—3 of Fig. 2;

Fig. 4 is a side elevation of a tire building core showing the start of the tread applying operation;

Fig. 5 is a partial view from the right in Fig. 4;

Fig. 6 is a partial view similar to Fig. 4 showing the completion of the tread applying operation; and Fig. 7 is a view similar to Fig. 6 illustrating the joining of the ends of the tread strip, and showing the tread applying device swung to inoperative position.

The outer rubber wearing surface of automobile tire casings is generally applied as a strip to the built up carcass. This tread strip is of less length than the circumference of the carcass, so that a considerable stretch is given in its application. The amount of stretch may vary in different methods of tire construction, but in one method with which I am familiar, in which the circumference around the crest of the carcass (the length to which the tread is to be stretched in applying it) is roughly 98 inches, the initial length of the tread strip is about 94 inches. It is usually desirable to place a definite weight of rubber in the tread, and for this reason the tread strips are weighed and cut until they weigh the required amount rather than being cut to specified lengths. As the density and gauge of the tread rubber will vary somewhat, the tread strips are of varying lengths as they come to the tire builder, but all require to be stretched to the same length, namely, the circumference of the carcass. By my invention I am enabled to accomplish this stretching as a process simultaneous with the application of the tread to the carcass, and without any previous stretching of the tread.

I have found that if the tread strip is run between rollers serving to compress it, preferably yieldingly, and is drawn onto the carcass by the rotation of the core on which the carcass is mounted by feeding the strip directly from the rollers to the core, the tread will be stretched an amount dependent upon the amount of compression given. By varying this compression in accordance with the amount of stretch necessary, tread strips of various lengths can be uniformly stretched onto tire carcasses of the same circumference. Knowing the original length of the strip it is a simple matter, through the devices which I have provided, to apply the strip to the tire so that its ends will meet, or any desired space be left between them.

The device which I prefer to employ for this purpose is shown in Fig. 1. It is secured in side frames 10 joined at the top by a piece 11. In the side frames are fixed bearing blocks 12 for a roll 13, conveniently having a hand wheel 14 for manual rotation. Sliding vertically on ribs 15 on the side frames are bearing blocks 16, in which is journaled the shaft 17 of a second roll 18 disposed directly above roll 13. Springs 19 tend normally to slightly separate rolls 13 and 18, and therefore assist in inserting a tread between them. Above blocks 16 is a plate 20, sliding on ribs 15, and spring pressed away from the blocks 16 by springs 21. By raising and lowering plate 20 the rolls 13 and 18 can be pressed together against the action of springs 19 with a varying yielding pressure in order to vary the stretch to be given to the strip.

The mechanism for adjusting plate 20 is preferably combined with an indicating device so that the operator may gauge visually the setting of the rolls and the stretch which will be given by that setting. For this purpose there is provided a sleeve 22 forming a spacer between the plate and the hub of a hand wheel 23. This hand wheel may be screwed up and down upon a threaded stud 24 firmly attached as at 25 to the top piece 11. By rotating the hand wheel the plate 20 can be moved up or down against the pressure of springs 21. The pressure of the various springs tends to keep the plate up; and the hand wheel acts against this pressure in making the adjustment.

The indicating mechanism is preferably made adjustable, so that, in a manner to be described, it may be set to give a definite stretch for varying qualities or conditions of the rubber stock. A rod 25' passes loosely through the stud 24 and at its lower end is attached to plate 20. In the form shown the rod is screwed to a block 26 held to plate 20 by a pin 27, and serving also to position sleeve 22. At the top of the rod is screwed an adjustable cap 28 which serves, as will be described below, to adjust the indicator so that it will give correct indications with different conditions of stock. Attached to top piece 11 is a bracket 29 having at one side a curved scale 30. A hand 31, pivoted to the bracket at 32, traverses the scale, and may, if desired, be spring pressed downwardly by a light spring 33. A lever 34 is pivoted at 35 to bracket 29, and has a contact point 36 adapted to bear on the under side of the pointer and a contact piece 37 adapted to bear upon the top of cap 28. The cap conveniently has a pointer 38 traversing a scale 39 on the bracket by which its condition of adjustment may be determined.

Before taking up the operation of these devices the general mounting and arrangement of the mechanism with reference to the core upon which the tire carcass is mounted will be considered. The core 40 has been in Fig. 4 shown conventionally as carried by arms 41 on a shaft 42 driven by intermediate gearing from a motor 43. Any suitable type of core and core drive may be used, and the motor 43 governed by any suitable clutch or control device. The tread applying device is carried by an arm 44, being preferably attached thereto by a pivot 45 so that it may be swung from the position indicated in Fig. 7 to the operative position of Figs. 5 and 6. This enables the operator to shift the applying device away from the core when he desires to do work on the latter. Suitable stops may be provided to limit the swinging movement of the device. A guiding trough 46, preferably having flanged tapering sides 47, is arranged to direct the tread strip 48 between rolls 13 and 18 in a substantially central position. As a further aid to centering the tread on the tire carcass, roll 18 preferably has a mark or groove 49 around its central portion, with which the operator can register a mark 50 (Fig. 5) on the upper surface of the tread. Such a mark is usually formed on treads for the purpose of assisting the operator to center the tread by hand. By the described mechanism, however, the tread can be laid on the carcass originally with such great accuracy that no hand centering is required.

Having thus described one mechanical embodiment of my invention, I will now describe the manner of applying a tread to a tire. Assuming a tire carcass to be mounted upon the core 40 and the tread applying device swung into operative position and properly adjusted for the length of tread being used (the method of adjustment being later considered) the leading end of the tread 48 is fed between the rolls by rotating hand wheel 14, and stuck to the carcass at 51. The core is then rotated, drawing the tread through the rolls and stretching it uniformly throughout its length, until the condition of Fig. 6 results. The hand wheel 23 is preferably set so that a slight space will be left between the ends of the tread, as the last end portion will not remain when applied under the same stretch as the rest of the tread for the reason that it will shrink as it leaves the rolls. The end of the tread can then be pulled away from the carcass, as indicated in dotted lines in Fig. 7, stretched manually a sufficient amount, and its end butted against end 51 as indicated in full lines in that figure. The tread can now be stitched or rolled down in any usual or desired manner.

As previously stated, individual treads will in practice be of varying lengths even though being of uniform weights, and therefore containing equal quantities of rubber. These treads must be stretched until their ends come the desired distance apart (say an inch or less) as they are laid on their carcasses (Fig. 6). The scale 30 could be graduated so as to read in arbitrary figures, or in percentages of stretch, but I prefer, as the device will preferably be used on one size of tire continuously, to graduate the scale in figures corresponding to the length of the unstretched tread. As will be apparent from Fig. 1, turning the hand wheel 23 so as to compress springs 21 will cause the pointer to change from 96, the reading shown, towards 93. A 93 inch tread will require more stretching than one of 96 inches, and this will be automatically accomplished if the hand wheel be turned the proper amount as indicated by the pointer.

The treads may run in different condition from time to time, and to accommodate such variations the adjustable cap 28 is provided. If this cap be rotated so as to raise it on pin 25', the pointer will be raised for the same setting of the rolls 18, and to bring the pointer to correspond with the proper setting of rolls 18 the hand wheel 23 must be screwed down. As this places more tension on the rolls, and consequently tends to induce a greater stretch in the tread, it will be seen that this adjustment of the cap will compensate for treads which are harder to stretch although of the same length. A cold tread, or one that has stood for a considerable time, possesses this characteristic, and in the drawings I have shown the scale 39 as labelled "cold" and "hot," indicating the direction of adjustment to accommodate treads varying in these factors.

Scale 39 could also be graduated in tire sizes, or according to the length desired in the stretched tread, if variation in these factors becomes desirable, the pointer 31 still correctly indicating the adjustment for varying original lengths.

Having thus described my invention I claim:

1. In a device for applying treads to tire casings, a pair of rotatable rolls, means to press the rolls yieldingly towards each other whereby a tread will be stretched as it is drawn between the rolls, means for adjusting the pressure, and indicating means adapted to show the amount of stretch to be given to the tread, said indicating device being graduated to read in terms of the unstretched lengths of treads which it is desired to stretch to uniform lengths.

2. In a device for applying treads to tire casings, a pair of rotatable rolls, means to press the rolls yieldingly toward each other whereby a tread will be stretched as it is drawn between the rolls, means for adjusting the pressure, indicating means adapted to show the amount of stretch to be given to the tread, and an auxiliary adjustment whereby the indicating device may be caused to register correctly for different conditions.

3. In a device for applying treads to tire casings, a pair of rotatable rolls, movable journals for one of said rolls, spring means adapted to press the rolls together, means for regulating the pressure of the spring means, an indicating device showing the condition of adjustment of the regulating means, and an adjustment serving to vary the showing of the indicating device to compensate for material of different quality passing between the rolls.

CHARLES H. DESAUTELS.